United States Patent Office 3,197,512
Patented July 27, 1965

3,197,512
THERMAL ISOMERIZATION OF HIGHLY FLUORINATED-1:3 AND 1:4-HEXADIENES
Ronald Eric Banks, Burnage, Manchester, Anthony Kenneth Barbour, Coombe Dingle, Bristol, Colin Russell Patrick, Quinton, Birmingham, and John Colin Tatlow, Kings Norton, Birmingham, England, assignors to National Research Development Corporation, London, England, a British corporation
No Drawing. Filed Sept. 4, 1959, Ser. No. 838,056
Claims priority, application Great Britain, Sept. 11, 1958, 29,174/58
6 Claims. (Cl. 260—648)

The present invention relates to fluorinated cyclohexadienes.

Fluorinated cyclohexadienes may be produced by the dehydrofluorination of the appropriate constituents of the mixture of polyfluorocyclohexanes formed by the fluorination of benzene or cyclohexane.

Usually the dehydrofluorination process gives a mixture of the two isomeric cyclohexa-1:3-and 1:4-dienes, that is the two corresponding diene isomers having the same number of fluorine atoms per molecule without regard to the molecular position of the fluorine atoms. In many cases the two corresponding -1:3- and -1:4-diene isomers are not of equal utility, the -1:3-isomers usually being required as they are generally more reactive. The present invention has as its object the provision of a process for the interconversion of corresponding -1:3- and -1:4-diene isomers so that a greater yield of one is obtained at the expense of a reduced yield of the other.

It is to be expected that the action of heat on these compounds would give rise to a variety of products derived from such reactions as fragmentation, condensation of these fragments, and dehydrofluorination (in cases where the diene starting material contains hydrogen).

It has been discovered, however, that under certain reaction conditions a desired isomerisation reaction can be made to predominate.

In accordance with the invention, the conversion of either a highly fluorinated cyclohexa-1:3- or -1:4-diene to its corresponding diene isomer may be brought about by heating the compound in inert surroundings to a temperature of at least 100° C. and not more than about 700° C. and preferably to a temperature within the range 200°–600° C.

The reaction is particularly applicable to the highly fluorinated cyclohexadienes containing not more than one hydrogen atom per molecule.

The reaction must be carried out in inert surroundings, for example, in an autoclave or by passing the compound as a gas in a stream of nitrogen or as a liquid through an inert unpacked tube made, for example, of a noble metal, carbon, in certain cases silica, or nickel or copper if aged or otherwise inert. If the reaction is not carried out in inert surroundings other reactions such as dehydrofluorinatons and defluorinations will be encouraged.

The product of this reaction is a mixture of the two diene isomers whose composition is determined by the thermodynamic equilibrium between them. This equilibrium is such that the proportion of one diene isomer does no greatly predominate over the proportion of the other so that if either the -1:3- or the -1:4-diene isomer is used as starting material a significant amount of the other isomer is formed by the reaction. The proportions of the isomers produced is also not greatly dependent upon the reaction temperature within the specified ranges.

We have discovered that for the octafluorocyclohexadienes and the heptafluorocyclohexadienes, the reaction moves rapidly towards equilibrium and considerable reaction can take place within one or two minutes at the reaction temperature. Equilibrium or near equilibrium conditions are established within the order of five minutes or less.

The conversion of either octafluorocyclohexa-1:3- or -1:4-diene to its corresponding diene isomer may be conveniently carried out by heating the compound in inert surroundings to a temperature between about 400° and 600° C. for a short time which need not exceed a few minutes.

The conversion of either a heptafluorocyclohexa-1:3-diene to its corresponding -1:4-diene isomer or a heptafluorocyclohexa-1:4-diene to its corresponding -1:3-diene may be carried out by heating the compound in inert surroundings to a temperature between about 200° and 300° C.

The products of the reaction may be readily separated by gas chromatographic methods to yield the required diene isomer substantially free from the starting material and any other products.

Various specific examples of isomerisation reactions carried out in accordance with the invention will now be described.

These reactions were carried out in unpacked heated tubes through which the compounds were passed. For the reactions described in the examples the tubes all had a diameter of 1" and were heated in a furnace of length 1'6", whose central zone, about 4–5" in length, was at the temperature measured and specified as the temperature of the reaction. The starting materials were introduced either into a heated glass tube outside the furnace, there volatilised, and passed into the reaction tube by means of a stream of nitrogen or alternatively, fed directly into the reactor as liquids. The reaction products were condensed in a tube immersed in liquid air, and were examined and separated by means of gas chromatography using a thermal conductivity cell as detector. Identification of the products was confirmed using infra-red spectroscopy. Nickel and copper reaction tubes were "aged" by previous experiments in order to render the tubes inert. This ageing process probably involves the formation of an impervious layer of metallic fluoride on the surface.

*Example 1*

Octafluorocyclohexa-1:4-diene (51 parts) was passed through an "aged" nickel tube heated to 530° C. at the rate of 1.6 g. per minute. The product (48 parts) was shown to be a mixture of octafluorocyclohexa-1:3-diene (27% by weight), other products (15%) and unchanged starting material (58%).

*Example 2*

Octafluorocyclohexa-1:4-diene (52 parts) was passed through an "aged" nickel tube heated to 600° C. at a rate of 1.6 g. per minute. The product (49 parts) was shown to consist almost exclusively of the isomeric dienes, its weight composition being octafluorocyclohexa-1:3-diene (32%), other products (4%) and unchanged starting material (64%).

*Example 3*

Octafluorocyclohexa-1:4-diene (3.2 parts) was passed through an "aged" nickel tube heated to 450° C. The product (2.9 parts) was shown to be a mixture of the isomeric dienes containing 40% of the 1:3-diene isomer. A large portion of the product was separated chromatographically and the two components identified by infrared spectroscopy.

Example 4

Octafluorocyclohexa-1:4-diene (40 parts) was passed through an "aged" copper tube of diameter 1" and of length 1'6" heated to a temperature of 500° C. at a rate of 1.6 g. per minute. The product (38 parts) contained octafluorocyclohexa-1:4-diene (60%), other products starting material (84%).

Example 5

Octafluorocyclohexa-1:3-diene (16 parts) was passed through a nickel tube packed with "aged" nickel gauze heated to a temperature of 500° C. at a rate of 1.6 g. per minute. The product (15.5 parts) contained by weight octafluorocyclohexa-1:4-diene (60%) other products (6%) and unchanged starting material (34%).

Example 6

1H-heptafluorocyclohexa-1:3-diene (3.2 parts) was passed through an "aged" nickel tube at 260° C. The product (3.1 parts) contained three components in approximately equal proportions. These were separated and shown by infra-red spectroscopy to be 1H-heptafluorocyclohexa-1:3-diene, 1H-heptafluorocyclohexa-1:4-diene and 2H-heptafluorocyclohexa-1:3-diene.

Example 7

Octafluorocyclohexa-1:4-diene (13.2 parts) was passed through a silica tube 1" in diameter, 1'6" in length, heated to 530° C. at a rate of 0.2 g. per minute. The product (13 parts) contained by weight octafluorocyclohexa-1:3-diene (11%) and unchanged starting material (89%).

We claim:

1. A process for the manufacture of a highly fluorinated cyclohexadiene isomer selected from the group consisting of the highly fluorinated cyclohexa-1:3-diene and the highly fluorinated cyclohexa-1:4-diene isomers from a material essentially consisting of the isomer other than the one to be manufactured which comprises heating said material essentially consisting of the other isomer to a temperature between 100 and 700° C. in inert surroundings to produce a mixture of said highly fluorinated cyclohexa-1:3-diene and highly fluorinated cyclohexa-1:4-diene isomers and separating the highly fluorinated cyclohexadiene isomer to be manufactured from the reaction product.

2. The process of claim 1 in which said highly fluorinated cyclohexadiene is one containing not more than one hydrogen atom per molecule.

3. A process for the manufacture of octafluorocyclohexa-1:3-diene from octafluorocyclohexa-1:4-diene which comprises heating a material essentially consisting of octafluorocyclohexa-1:4-diene to a temperature between about 450° and 600° C. in inert surroundings and separating the octafluorocyclohexa-1:3-diene from the reaction product.

4. A process for the manufacture of octafluorocyclohexa-1:4-diene from octafluorocyclohexa-1:3-diene which comprises heating a material essentially consisting of the octafluorocyclohexa-1:3-diene to a temperature between about 450° and 600° C. in inert surroundings and separating the octafluorocyclohexa-1:4-diene from the reaction product.

5. A process for the manufacture of heptafluorocyclohexa-1:3-diene from heptafluorocyclohexa-1:4-diene which comprises heating a material essentially consisting of the heptafluorocyclohexa-1:4-diene to a temperature between about 200° and 300°C. in inert surroundings and separating the heptafluorocyclohexa-1:3-diene from the reaction product.

6. A process for the manufacture of a heptafluorocyclohexa-1:4-diene from the isomeric heptafluorocyclohexa-1:3-diene which comprises heating a material essentially consisting of the heptafluorocyclohexa-1:3-diene to a temperature between about 200° and 300° C. and separating the heptafluorocyclohexa-1:4-diene from the reaction product.

References Cited by the Examiner

UNITED STATES PATENTS

| | | | |
|---|---|---|---|
| 2,432,997 | 12/47 | Ligett et al. | 260—648 |
| 2,498,891 | 2/50 | Ligett et al. | 260—648 |

OTHER REFERENCES

Gething et al., Nature, vol. 183, pp. 586–587 (1959).

LEON ZITVER, *Primary Examiner.*

ALLAN M. BOETTCHER, ALPHONSO D. SULLIVAN, *Examiners.*